Dec. 4, 1956 M. L. ROBB 2,772,443
SPLIT MOLD
Filed Jan. 27, 1955
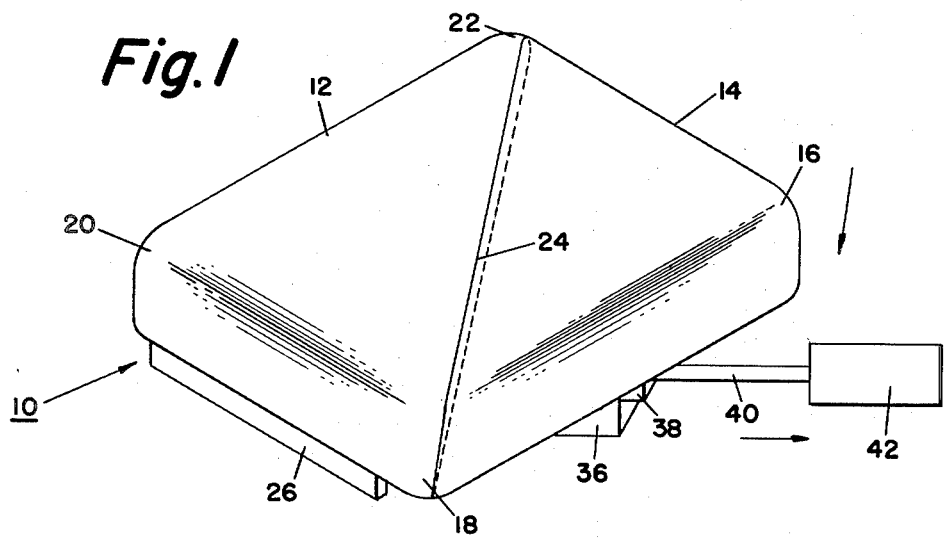
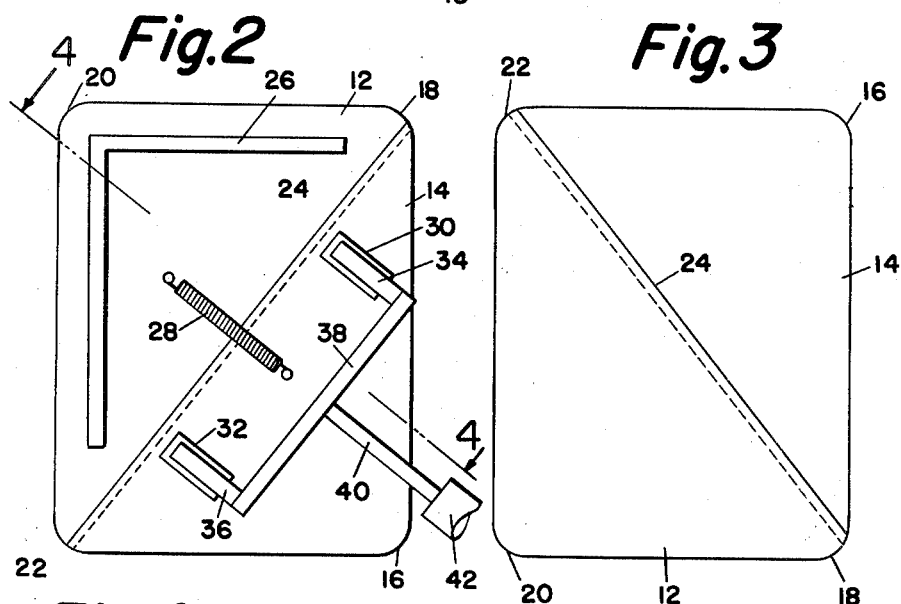
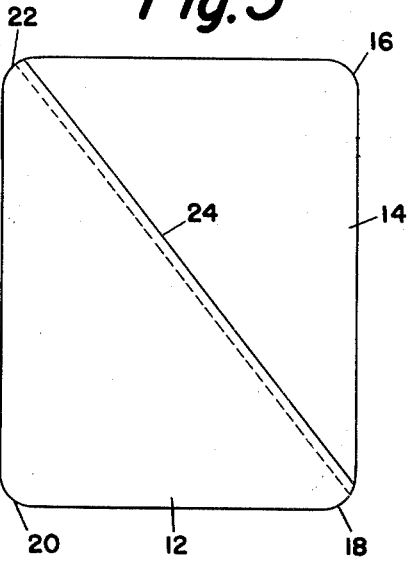
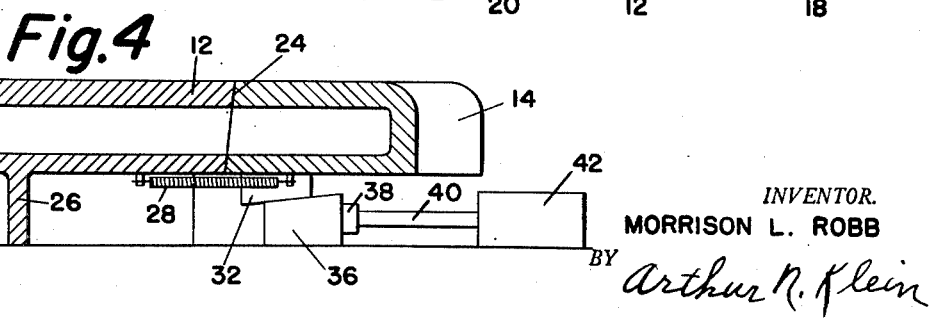
INVENTOR.
MORRISON L. ROBB
BY Arthur N. Klein
ATTORNEY United States Patent Office 2,772,443
Patented Dec. 4, 1956

2,772,443
SPLIT MOLD
Morrison L. Robb, Philadelphia, Pa.
Application January 27, 1955, Serial No. 484,421
5 Claims. (Cl. 18—35)

This invention relates to a split mold and more particularly to a mold for forming plastic articles on the outer surface thereof.

A frequently used method of forming plastic articles such as open-mouthed plastic boxes comprises placing a thin sheet of heated plastic over a unitary mold, and evacuating the vessel within which the plastic and mold are situated. By this means, the rapidly cooled plastic sheet assumes the exact shape of the mold on which it is draped. When the plastic has cooled it becomes rigid and retains its formed shape even after being removed from the mold. Although most plastics are somewhat resilient and pliable, it has been found that if the sides of the mold are vertical, the plastic will be too tightly formed over the mold to permit facile sliding off therefrom.

The present invention has an object the provision of a split mold for making articles having parallel sides.

Another object of the present invention is the provision of a split mold for making articles having vertical sides.

A further object of the present invention is the provision of a split mold which can be separably removed from a formed object inserted thereover.

For the purpose of illustrating this invention, one form thereof, which is presently preferred, is shown in the accompanying drawings, it being understood, however, that the invention is not limited to the precise arrangements and instrumentalities illustrated.

In the accompanying drawings, wherein like reference characters indicate like parts throughout:

Figure 1 is a perspective view of a preferred embodiment of the mold of the present invention.

Figure 2 is a plan view of the bottom of the mold of the present invention.

Figure 3 is a plan view from above of the top of the mold.

Figure 4 is a section on line 4—4 of Fig. 2.

In the drawings, 10 designates the mold of the present invention which includes mold sections 12 and 14 having alignable upper surfaces. Mold sections 12 and 14, when aligned as in Figure 4 with their upper surfaces disposed in the same plane, comprise a generally restangular block having rounded corners 16, 18, 20 and 22. The mold sections 12 and 14 are split along a dividing plane designated at 24. Dividing plane 24 passes at a minor included angle to the vertical such as an angle of about 5 to about 60 degrees to the vertical, and extends from corner 18 to corner 22. Mold section 12 is larger than mold section 14 on both the upper and the lower surfaces thereof. Thus, the dividing plane or the plane of separation 24 is spaced from and on the same side of the diagonal passing through the center of corners 18 and 22 both on the upper surface of mold 10 and on the lower surface of mold 10, although, of course, it is closer to the diagonal on the lower surface of mold 10 than to the diagonal on its upper surface. The plane of separation should fall within the arc comprising the rounded corners for the entire thickness of the mold.

I have found, for example, that for a one-inch thick rectangular mold having rounded corners, each comprising an arc with a radius of a half inch, the plane of separation 24 may be spaced from the diagonal at a distance of 0.14 inch on the upper surface of the mold and spaced on the same side of the diagonal a distance of 0.05 inch on the bottom surface of the mold, and that under these circumstances the included angle to the vertical of the plane of said separation will be about five and one-quarter to five and one-half degrees. In any given cross-sectional plane, the line forming the plane of separation should be generally parallel to the diagonal. With mold sections of different thicknesses and different arcs of curvature, different angles to the vertical for the plane of separation can be utilized.

However, in all cases it is essential for the purposes of the present invention that the plane of separation be on the same side of the diagonal for the combined mold sections, which means that the diagonal for the combined mold sections must be included on both the upper and lower surfaces within mold section 12. Furthermore, the plane of separation should be included within the rounded corners of the mold sections.

Mold section 12 is carried by a fixedly secured pedestal or support 26, which may be fixedly secured to a supporting surface.

Mold section 14 is movable and may be slid along the plane of separation 24. It is secured to mold section 12 by tension spring 28 which urges mold section 14 firmly against mold section 12. A pair of block wedges 30 and 32 are fixed to the undersurface of mold section 14 as by soldering, welding or the like. Block wedges 30 and 32 are supported over respective mating wedges 34 and 36 which form yoke arms for yoke 38. The undersurface of mating wedges 34 and 36 are flat and are coplanar with the undersurface of pedestal 26. Thus, when the mold 10 is mounted on a flat supporting surface the wedges 34 and 36 may be slid across the flat supporting surface.

Yoke 38 forms the head of a piston 40 which is actuated by cylinder 42. Cylinder 42, which is shown diagrammatically in Figures 1 and 4, can be actuated in either direction so that piston 40 may be advanced or withdrawn.

The operation of the separable mold of the present invention is as follows:

A sheet of heated plastic may be placed over the outer surface of the mold sections 12 and 14 when their upper surfaces are in the same plane, and the plastic draped about the mold under vacuum. On cooling, the plastic becomes rigid. As the upper surfaces of mold sections 12 and 14 are parallel a flat bottomed plastic object with parallel vertical sides is formed.

When the plastic object is formed and hardened, mold section 14 may be lowered away and out of the formed plastic container (in the direction of the arrow to the right of Figure 1) by moving piston 40 away from mold section 12 (see direction of arrow below piston 40).

In order to raise mold section 14 it is only necessary to advance piston 40 in the direction of mold section 12. This raising should, of course, be effected only after the molded object has been removed from mold section 12. No difficulty will be encountered in removing the molded object from mold section 12, when the mold section 14 is positioned therebeneath, because the molded object will be carried only on rounded corner 20 and a fraction of rounded corners 18 and 22; and because the plastic possesses sufficient pliability to be lifted off the fraction of rounded corners 18 and 22.

The present invention may be embodied in other specific forms and, therefore, the foregoing description is to be considered in all respects merely as illustrative and not restrictive, reference being made to the appended claims as indicating the scope of this invention.

Having thus described my invention, I claim as new and desire to protect by Letters Patent, the following:

1. A mold for forming objects on the outer surface thereof including a pair of mold sections, the combined mold sections having a polygonal cross-section, the corners of said mold sections being rounded, one of said mold sections being larger than the other, said mold sections being separated along a plane surface angularly positioned to the vertical at a minor included angle, with said plane of separation being spaced from and on the same side of said diagonal throughout the entire thickness of said mold sections and included within the arc formed by the rounded corners, the larger of said mold sections being provided with means for fixedly securing the same to a supporting surface, and the smaller of said mold sections being provided with means for moving said mold section along said supporting surface, whereby said smaller mold section may be raised and lowered on the surface of the larger mold section formed by the plane of separation.

2. A mold for forming objects on the outer surface thereof including a pair of mold sections, the combined mold sections having a polygonal cross-section, the corners of said mold sections being rounded, one of said mold sections being larger than the other, said mold sections being separated along a plane surface angularly positioned to the vertical at a minor included angle, with said plane of separation being spaced from and on the same side of said diagonal throughout the entire thickness of said mold sections and included within the arc formed by the rounded corners, the larger of said mold sections being provided with means for fixedly securing the same to a supporting surface, and the smaller of said mold sections being provided with means for moving said mold section along said supporting surface, said means including mating sliding wedges, whereby said smaller mold section may be raised and lowered on the surface of the larger mold section formed by the plane of separation.

3. A mold for forming rectangular mold objects comprising a rectangularly shaped pair of mold sections, the corners of said mold sections being rounded, said mold sections being separated along a plane spaced from the diagonal, and angularly positioned to the vertical at a minor included angle of between 5 to 60 degrees, said plane of separation being included within the arc of the rounded corners and on the same side of the diagonal for the entire thickness of the mold section, means secured to the undersurface of the larger of said mold sections for fixedly securing said larger mold section to a supporting surface, and means secured to the undersurface of the smaller of said mold sections for raising and lowering said mold section along the plane of separation.

4. A mold for forming rectangular mold objects comprising a rectangularly shaped pair of mold sections, the corners of said mold sections being rounded, said mold sections being separated along a plane spaced from the diagonal, and angularly positioned to the vertical at a minor included angle of between 5 to 60 degrees, said plane of separation being included within the arc of the rounded corners and on the same side of the diagonal for the entire thickness of the mold section, means secured to the undersurface of the larger of said mold sections for fixedly securing said larger mold section to a supporting surface, means secured to the undersurface of the smaller of said mold sections for raising and lowering said mold section along the plane of separation, and yielding means joining both of said mold sections for urging said mold sections together.

5. A mold for forming rectangular mold objects comprising a rectangularly shaped pair of mold sections, the corners of said mold sections being rounded, said mold sections being separated along a plane spaced from the diagonal, and angularly positioned to the vertical at a minor included angle of between 5 to 60 degrees, said plane of separation being included within the arc of the rounded corners and on the same side of the diagonal for the entire thickness of the mold section, means secured to the undersurface of the larger of said mold sections for fixedly securing said larger mold section to a supporting surface, and means secured to the undersurface of the smaller of said mold sections for raising and lowering said mold section along the plane of separation, said last-mentioned means including wedge blocks.

References Cited in the file of this patent

UNITED STATES PATENTS

| 746,960 | Heincke | Dec. 15, 1903 |
| 2,442,516 | Shriver | June 1, 1948 |

FOREIGN PATENTS

| 746,397 | Germany | Mar. 12, 1943 |